US008181799B2

(12) United States Patent  
Laliberte et al.

(10) Patent No.: US 8,181,799 B2  
(45) Date of Patent: May 22, 2012

(54) ACTUATION SYSTEM CONFIGURED FOR MOVING A PAYLOAD

(75) Inventors: Thierry Laliberte, Blanches (CA); Clement Gosselin, Eugene-Fiset (CA); Simon Foucault, St Augustin de Desmaures (CA); Boris Mayer-St-Onge, Andre-Fleury (CA); Dalong Gao, Troy, MI (US); Robert J. Scheuerman, Washington, MI (US)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 158 days.

(21) Appl. No.: 12/626,998

(22) Filed: Nov. 30, 2009

(65) Prior Publication Data

US 2011/0127229 A1    Jun. 2, 2011

(51) Int. Cl.
    *B66C 9/14*    (2006.01)
(52) U.S. Cl. ..................................... 212/320; 414/626
(58) Field of Classification Search ................. 414/560, 414/561, 591; 901/16, 21
    See application file for complete search history.

(56) References Cited

U.S. PATENT DOCUMENTS

| | | | | | |
|---|---|---|---|---|---|
| 422,399 | A | * | 3/1890 | Graham et al. | 212/320 |
| 508,476 | A | * | 11/1893 | Horton | 212/317 |
| 3,077,992 | A | * | 2/1963 | Bevard | 212/308 |
| 3,142,387 | A | * | 7/1964 | Minty | 212/320 |
| 3,344,933 | A | * | 10/1967 | Jelatis et al. | 212/285 |
| 4,327,596 | A | * | 5/1982 | Simon | 74/89.2 |
| 5,799,543 | A | * | 9/1998 | Nagai et al. | 74/490.09 |
| 5,804,932 | A | * | 9/1998 | Yanagisawa | 318/6 |
| 6,540,471 | B1 | * | 4/2003 | Brogårdh | 414/729 |
| 7,455,188 | B2 | | 11/2008 | Kahlman et al. | |

FOREIGN PATENT DOCUMENTS

JP    1-321297 A    * 12/1989

* cited by examiner

*Primary Examiner* — Michael Mansen  
*Assistant Examiner* — Juan Campos, Jr.  
(74) *Attorney, Agent, or Firm* — Quinn Law Group, PLLC

(57) ABSTRACT

An actuation system includes a bridge crane, a trolley, and an end effector and is configured for moving a payload. A first actuator is operatively connected to the bridge crane. The bridge crane is configured for moving along an X axis in response to the first actuator being actuated. The trolley extends from the bridge crane. A second actuator is operatively connected to the trolley. The trolley is configured for moving along a Y axis in response to the second actuator being actuated. The end effector extends from the trolley and is configured for supporting a payload. A third actuator is operatively connected to the end effector. The end effector is configured for rotating about the Z axis in response to the third actuator being actuated to rotate the end effector. Each actuator is disposed in spaced relationship to the bridge crane, the trolley, and the end effector.

11 Claims, 3 Drawing Sheets

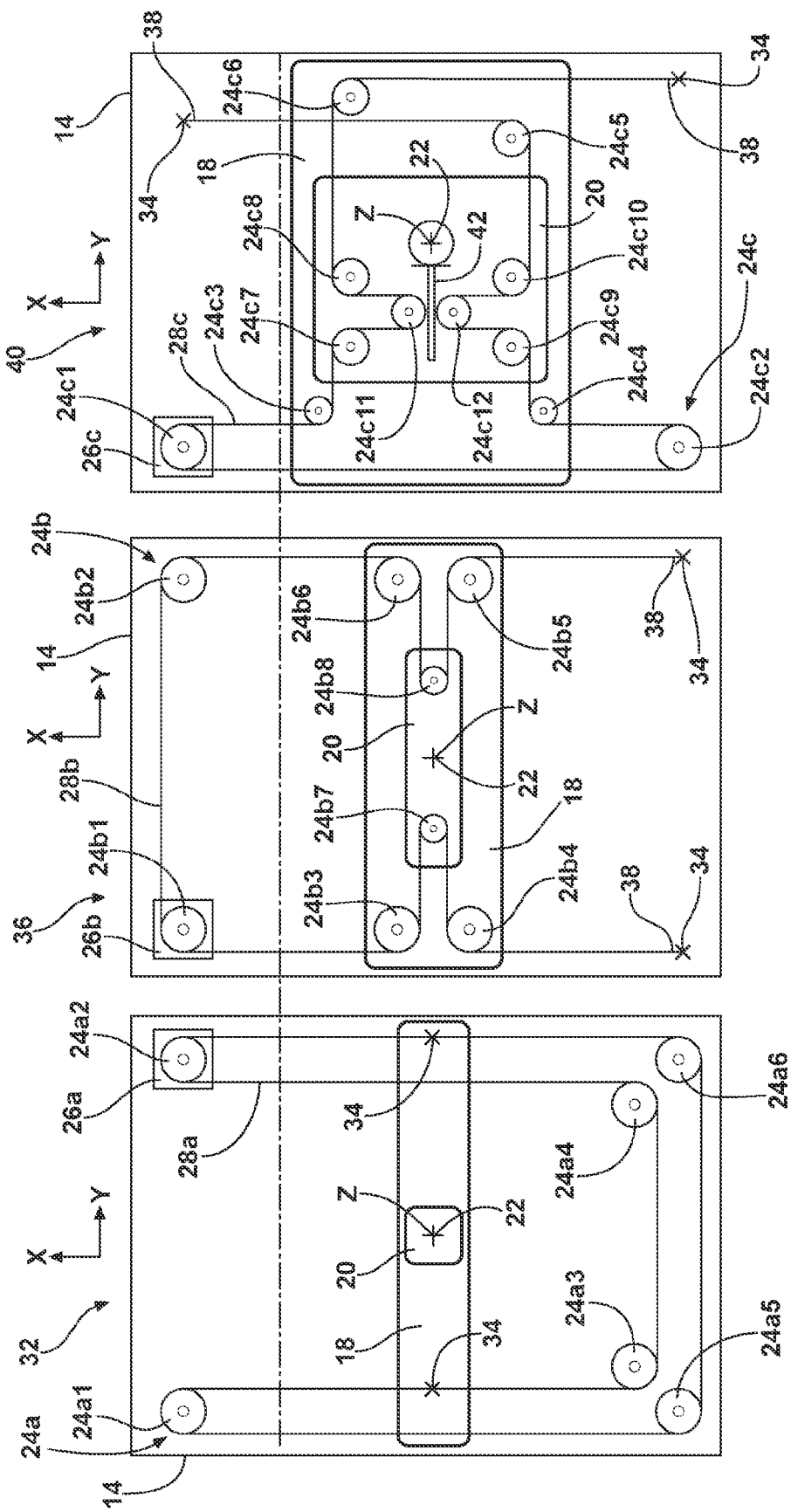

ACTUATION SYSTEM CONFIGURED FOR MOVING A PAYLOAD

TECHNICAL FIELD

The present invention relates to an actuation system that is configured for moving a payload.

BACKGROUND OF THE INVENTION

Overhead bridge cranes are widely used to lift and relocate large payloads. Generally, the displacement in a pick and place operation involves three translational degrees of freedom and a rotational degree of freedom along a vertical axis. This set of motions, referred to as a Selective Compliance Assembly Robot Arm ("SCARA") motions or "Schönflies" motions, is widely used in industry. A bridge crane allows motions along two horizontal axes. With appropriate joints, it is possible to add a vertical axis of translation and a vertical axis of rotation. A first motion along a horizontal axis is obtained by moving a bridge on fixed rails while the motion along the second horizontal axis is obtained by moving a trolley along the bridge, perpendicularly to the direction of the fixed rails. The translation along the vertical axis is obtained using a vertical sliding joint or by the use of a belt. The rotation along the vertical axis is obtained using a rotational pivot with a vertical axis.

There are partially motorized versions of overhead bridge cranes that are displaced manually along horizontal axes and rotated manually along the vertical axis by a human operator, but that include a motorized hoist in order to cope with gravity along the vertical direction. Also, some bridge cranes are displaced manually along all of the axes, but the weight of the payload is compensated for by a balancing device in order to ease the task of the operator. Such bridge cranes are sometimes referred to as assist devices. Balancing is often achieved by pressurized air systems. These systems need compressed air in order to maintain pressure or vacuum—depending on the principle used—which requires significant power. Also, because of the friction in the cylinders, the displacement is not very smooth and can even be bouncy. Balancing can be achieved using counterweights, which add significant inertia to the system. Although helpful and even necessary for the vertical motion, such systems attached to the trolley of a bridge crane add significant inertia regarding horizontal motion due to moving the mass of these systems. In the case of balancing systems based on counterweights, the mass added can be very large, even larger than the payload itself. If the horizontal traveling speed is significant, the inertia added to the system becomes a major drawback.

There are also fully motorized versions of such bridge cranes that require powerful actuators, especially for the vertical axis of motion which has to support the weight of the payload. These actuators are generally attached to the trolley or bridge and are then in motion. The vertical translation actuator is sometimes attached to the bridge and linked to the trolley by a system similar to what is used in tower cranes.

SUMMARY OF THE INVENTION

An actuation system is configured for moving a payload. The actuation system includes a bridge crane, a trolley, and an end effector. A first actuator is operatively connected to the bridge crane. The first actuator is disposed in spaced relationship to the bridge crane and is configured for being actuated. The bridge crane is configured for moving along an X axis in response to the first actuator being actuated. The trolley extends from the bridge crane. A second actuator is operatively connected to the trolley. The second actuator is disposed in spaced relationship to the trolley and is configured for being actuated. The trolley is configured for moving along a Y axis in response to the second actuator being actuated. The end effector extends from the trolley and is configured for supporting a payload. A third actuator is operatively connected to the end effector. The third actuator is disposed in spaced relationship to the end effector and is configured for being actuated. The end effector is configured for rotating about the Z axis in response to the third actuator being actuated to rotate the end effector.

A method is provided for moving a payload with an actuation system. The actuation system includes a bridge crane configured for moving along an X axis, a trolley extending from the bridge crane and configured for moving along a Y axis, and an end effector rotatably extending from the trolley and configured for supporting the payload and rotating about a Z axis. A first actuator is actuated to move the bridge crane and each of the trolley and the end effector along the X axis. The first actuator is disposed in spaced relationship to each of the bridge crane, the trolley, and the end effector. A second actuator is actuated to move the trolley and the end effector along the Y axis. The second actuator is disposed in spaced relationship to each of the bridge crane, the trolley, and the end effector. A third actuator is actuated to rotate the end effector about the Z axis. The third actuator is disposed in spaced relationship to each of the bridge crane, the trolley, and the end effector.

In another aspect of the invention, an actuation system is configured for moving a payload. The actuation system includes a bridge crane, a trolley, an end effector, and a transmission. A first actuator is disposed in spaced relationship to the bridge crane and is configured for being actuated. A first belt operatively interconnects the bridge crane and the first actuator. The bridge crane is configured for moving along an X axis in response to the first actuator being actuated to move the first belt. The trolley extends from the bridge crane. A second actuator is disposed in spaced relationship to the trolley and is configured for being actuated. A second belt operatively interconnects the trolley and the second actuator. The trolley is configured for moving along a Y axis in response to the second actuator being actuated to move the second belt. The end effector extends from the trolley and is configured for supporting a payload. A third actuator is disposed in spaced relationship to the end effector and is configured for being actuated. A third belt operatively interconnects the end effector and the third actuator. The end effector is configured for rotating about the Z axis in response to the third actuator being actuated to move the third belt. The transmission operatively interconnects the end effector and the third belt to transmit motion from the third belt to the end effector such that the end effector rotates about the Z axis.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 3A is a schematic plan view of an arrangement of the actuation system of FIG. 2 configured for moving the payload along the X axis;

FIG. 3B is a schematic plan view of an arrangement of the actuation system of FIG. 2 configured for moving the payload along the Y axis; and FIG. 3C is a schematic plan view of an arrangement of the actuation system of FIG. 2 configured for rotating the payload about the Z axis.

DESCRIPTION OF THE PREFERRED EMBODIMENTS

Figure 1:
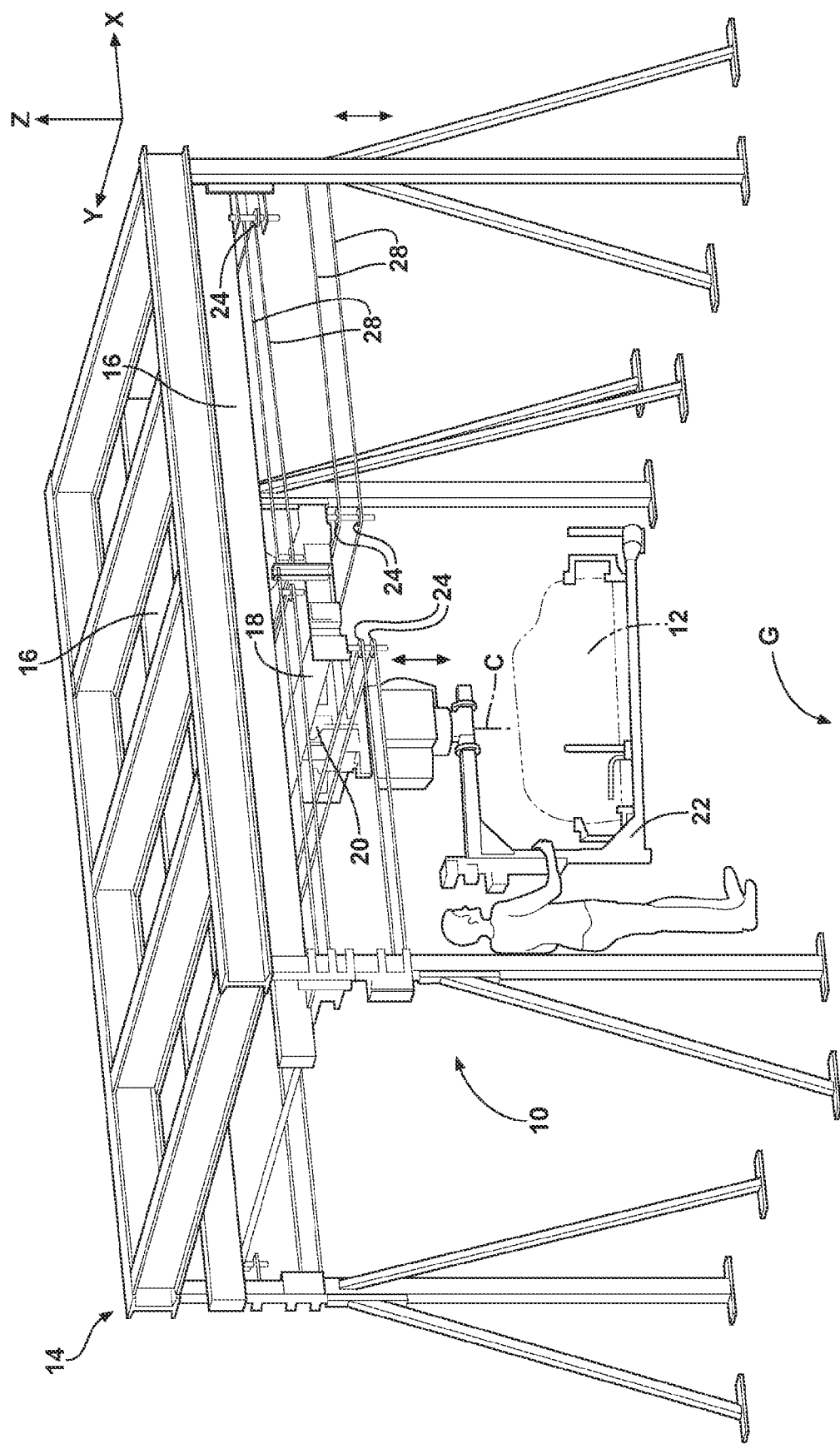
FIG. 1 is a schematic perspective view of an actuation system mounted to a support structure.

Referring to the drawings, wherein like reference numbers refer to like components, an actuation system 10 configured for moving a payload 12 in a plurality of directions is shown at 10 in FIG. 1. The actuation system 10 is mounted to a stationary support structure 14 that is configured to support the actuation system 10 and the payload 12. The support structure 14 includes, but is not limited to a pair of parallel rails 16 or runway tracks.

Figure 2:
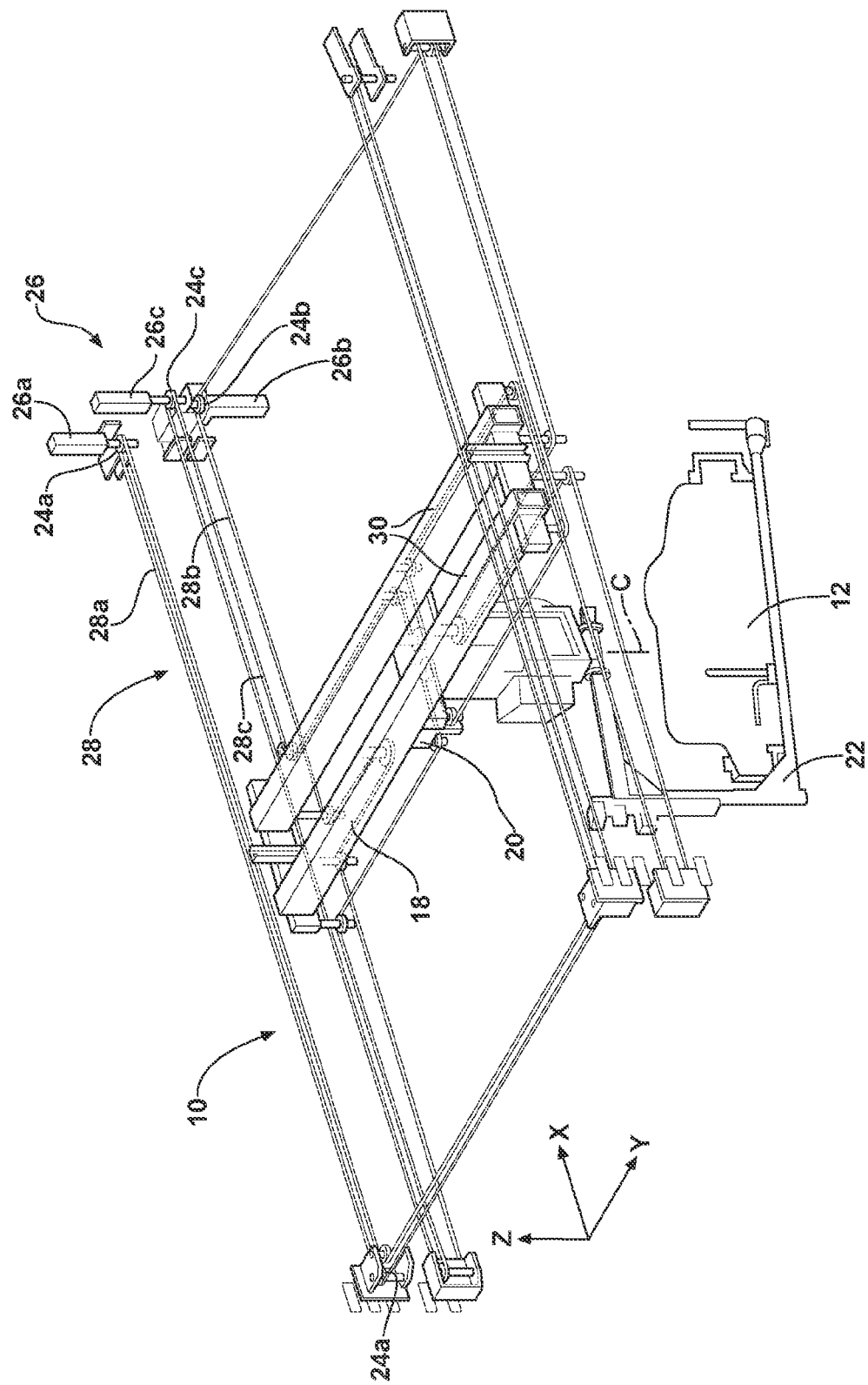
FIG. 2 is a schematic perspective view of the actuation system of FIG. 1, configured for moving a payload along each of an X axis, a Y axis, and about a Z axis.

Referring to FIG. 2, the actuation system 10 includes a bridge crane 18, a trolley 20, an end effector 22, a plurality of pulleys 24, a plurality of actuators 26, and a plurality of belts 28. The bridge crane 18 is a structure that includes at least one girder 30 that spans the pair of parallel rails 16. The bridge crane 18 is adapted to carry the payload 12 along an X axis. The trolley 20 is movably attached to the girders 30 of the bridge crane 18 such that the trolley 20 is adapted to carry the payload 12 along a Y axis, in generally perpendicular relationship to the X axis. The end effector 22 is rotatably attached to the trolley 20 such that the end effector 22 rotates about a Z axis, i.e., a center of rotation C. The Z axis extends in perpendicular relationship to the X axis and the Y axis, i.e., in a generally vertical direction relative to the ground G. The end effector 22 is configured to support the payload 12 and to be manipulated to rotate the payload 12 about the Z axis, as desired.

Referring to FIG. 3A-3C, the belts 28 include a first, a second, and a third belt 28a, 28b, 28c. The belts 28a, 28b, 28c may also be a cable, chain, and the like that has sufficient strength to move the payload 12, as required. The actuators 26 include a first, a second, and a third actuator 26a, 26b, 26c. The actuators 26a, 26b, 26c are preferably fixed to the support structure 14 or any other fixed object such that the actuator 26a, 26b, 26c does not move along with the payload 12. By preventing movement of the actuators 26a, 26b, 26c, and therefore their drives and controller boxes, inertia of the system 10 is reduced.

The pulleys 24 are used to move the payload 12 along the X axis, the Y axis, and about the Z axis, as shown in FIGS. 3A-3C. More specifically, a first plurality of the pulleys 24a are used to move the payload 12 along the X axis, a second plurality of the pulleys 24b are used to move the payload 12 along the Y axis, and a third plurality of the pulleys 24c are used to rotate the payload 12 about the Z axis. The pulleys 24a, 24b, 24c are preferably arranged such that the first, second, and third plurality of pulleys 24a, 24b, 24c operate in parallel planes so that there is no interference between the separate groups of pulleys 24a, 24b, 24c, as shown in FIG. 2. Arrangements or routings of the first, the second, and the third plurality of pulleys 24a, 24b, 24c are fully decoupled from each other to simplify control of the movement of the payload 12 along the X and Y axes, and about the Z axis, by eliminating antagonistic forces.

Referring to FIG. 3A, a first arrangement 32 is shown that is configured for moving the bridge crane 18 and the associated payload 12 along the X axis. The first arrangement 32 includes the first plurality of pulleys 24a, the first actuator 26a, and the first belt 28a. More specifically, the first arrangement 32 includes six pulleys 24a1-24a6 that are disposed in spaced relationship to one another, i.e., any distance that separates the pulleys 24a1-24a6 from one another. More specifically, the bridge crane 18, the trolley 20, and the end effector 22 are disposed such that one pair of the first pulleys 24a1, 24a2 is on one side of the bridge crane 18, the trolley 20, and the end effector 22, and the remaining four of the first pulleys 24a3-24a6 are an opposing side. The first belt 28 is a continuous loop that is anchored to the bridge crane 18 at two fixed points 34 that are in spaced relationship to one another and is routed through each of the first pulleys 24a1-24a6. The spaced relationship of the two fixed points 34, as used here, is defined as any distance that separates the pulleys 24a1-24a6 from one another. This routing is not only configured to transmit movement to the bridge crane 18, but to also assist in stabilizing the orientation of the bridge crane 18, i.e., prevents twisting of the bridge crane 18 with respect to the parallel rails 16. The first actuator 26a is fixed to the support structure 14 and is operatively connected to one of the first pulleys 24a2. Additionally, the first actuator 26a is fixed and does not move with the payload 12. As the first actuator 26a is actuated, the first actuator 26a rotates the corresponding first pulley 24a2, causing the first belt 28a to also move. As the first belt 28a moves, the first belt 28a transmits movement to the bridge crane 18 such that the bridge crane 18 moves along the X axis by virtue of the two fixed points 34 that anchor the first belt to the bridge crane 18. Additionally, motion is only transmitted from the first belt 28a to the bridge crane 18 such that no movement is transmitted by the first belt 28a to the trolley 20 or the end effector 22.

Referring to FIG. 3B, a second arrangement 36 is shown that is configured for moving the trolley 20 and the associated payload 12 along the Y axis. The second arrangement 36 includes the second plurality of pulleys 24b, the second actuator 26b, and the second belt 28b. More specifically, the second arrangement 36 includes eight pulleys 24b1-24b8 that are disposed in spaced relationship to one another, i.e., any distance that separates the pulleys 24b1-24a8 from one another. The second belt 28b extends between opposing ends 38. The second belt 28b is anchored to the support structure 14 at a pair of fixed points 34, at or near each of the ends 38 and is routed around each of the eight pulleys 24b1-24b8. Therefore, the fixed points 34 and the associated ends 38 do not move with the payload 12. A pair of the second pulleys 24b1, 24b2 is affixed to the support structure 14 in spaced relationship to one another along the Y axis. One of the pair of the second pulleys 24b1 may be operatively attached to the second actuator 26b, as shown in FIG. 3B. The bridge crane 18, the trolley 20, and the end effector 22 are movably disposed between the pair of the second pulleys 24b1, 24b2 and the fixed points 34 of the ends 38 of the second belt 28b. Four of the second pulleys 24b3-24b6 are operatively attached to the bridge crane 18 and another pair of the second pulleys 24b7, 24b8 are mounted to the trolley 20. More specifically, the other pair of the second pulleys 24b7, 24b8 are disposed in spaced relationship to one another, along the Y axis, such that the center of rotation C of the end effector 22 is disposed therebetween. As the second actuator 26b is actuated, the second actuator 26b causes a corresponding one of the second pulleys 24b1 to rotate, thereby moving the second belt 28b about the second pulleys 24b1-24b8. As the second belt 28b moves, the second belt 28b transmits movement to the trolley 20 such that the trolley 20 moves along the Y axis, relative to the fixed pair of the second pulleys 24b1, 24b2 and the two fixed points 34 that are each anchored to the support structure 14. Additionally, motion is only transmitted from the second belt 28b to the trolley 20 such that no motion is transmitted by the second belt 28b to the bridge crane 18 or the end effector 22.

Referring to FIG. 3C, a third arrangement 40 is shown that is configured for rotating the end effector 22 and the associated payload 12 about the Z axis at the center of rotation C. The third arrangement 40 includes the third plurality of pulleys 24c, the third actuator 26c, and the third belt 28c. More specifically, the third arrangement 40 includes twelve pulleys 24c1-24c12 that are disposed in spaced relationship to one another, i.e., any distance that separates the pulleys 24c1-24c12 from one another. The third belt 28c extends between opposing ends 38 and is anchored at two fixed points 34 to the support structure 14, or any other fixed location, that does not move with the payload 12 and is routed around each of the twelve pulleys 24c1-24c12. The fixed points 34 are in spaced relationship to one another along the X axis. Additionally, a pair of the third pulleys 24c1, 24c2 are in spaced relationship to one another along the X axis and in spaced relationship to the fixed points 34 along the Y axis. The bridge crane 18, the trolley 20, and the end effector 22 are disposed between the fixed points 34 and the pair of third pulleys 24c1, 24c2. Four of the third pulleys 24c3-24c6 are operatively disposed on the bridge crane 18 in spaced relationship to one another. Six of the third pulleys 24c7-24c12 are operatively disposed on the trolley 20. A transmission 42 is operatively disposed between the center of rotation C of the end effector 22 and a pair of the third pulleys 24c11, 24c12 are disposed on the trolley 20 such that movement of the third belt 28c between the pair of third pulleys 24c11, 24c12 transmits motion via the transmission 42 to the center of rotation C to rotate the end effector 22 about the Z axis. The transmission 42 may be a rack and pinion or any other transmission 42 known to those skilled in the art. As the third actuator 26c is actuated, the third actuator 26c causes the corresponding third pulley 24c1 to rotate, thereby moving the third belt 28c relative to the third pulleys 24c1-24c12. As the third belt 28c moves, the third belt 28c transmits movement to the end effector 22 such that the end effector 22 rotates about the Z axis. Additionally, motion is only transmitted from the third belt 28c to the end effector 22 such that no motion is transmitted from the third belt 28c to the bridge crane 18 or the trolley 20. Another routing, not shown, may be used to connect another actuator to move the end effector 22 vertically along the Z axis.

It should be appreciated that other arrangements of the plurality of pulleys, the plurality of belts, and the plurality of actuators may also be used, as known to those skilled in the art, such that motion along the X, Y, and Z axes are also decoupled, actuated, and controlled independently.

While the best modes for carrying out the invention have been described in detail, those familiar with the art to which this invention relates will recognize various alternative designs and embodiments for practicing the invention within the scope of the appended claims.

The invention claimed is:

1. An actuation system configured for moving a payload, the actuation system comprising:
   a bridge crane;
   a first actuator operatively connected to the bridge crane, the first actuator disposed in spaced relationship to the bridge crane and configured for being actuated;
   a first belt operatively connecting the bridge crane and the first actuator such that the first belt moves the bridge crane along an X axis in response to actuation of the first actuator;
   a first plurality of pulleys configured to rotate and move the first belt such that the bridge crane moves along the X axis;
   a trolley extending from the bridge crane;
   a second actuator operatively connected to the trolley, the second actuator disposed in spaced relationship to the trolley and configured for being actuated;
   a second belt operatively connecting the trolley and the second actuator such that the second belt moves the trolley along a Y axis in response to actuation of the second actuator;
   a second plurality of pulleys configured to rotate and move the second belt such that the trolley moves along the Y axis;
   an end effector extending from the trolley and configured for supporting a payload;
   a third actuator operatively connected to the end effector, the third actuator disposed in spaced relationship to the end effector and configured for being actuated;
   a third belt operatively connecting the end effector and the third actuator;
   a third plurality of pulleys configured to rotate and move the third belt;
   wherein a pair of the third pulleys are operatively disposed on the trolley; and
   a transmission operatively disposed on the trolley between a Z axis of the end effector and the pair of the third plurality of pulleys such that movement of the third belt transmits motion from the pair of the third plurality of pulleys to the transmission to cause the end effector to rotate about the Z axis.

2. An actuation system, as set forth in claim 1, wherein the first belt is anchored to the bridge crane at a pair of fixed points.

3. An actuation system, as set forth in claim 2, wherein the first belt is a continuous loop.

4. An actuation system, as set forth in claim 1, wherein each of the first plurality of pulleys are disposed in spaced relationship to each of the bridge crane, the trolley, and the end effector.

5. An actuation system, as set forth in claim 1, wherein the second belt is anchored at a pair of fixed points disposed in spaced relationship to the trolley.

6. An actuation system, as set forth in claim 1 wherein the second belt extends between opposing ends and the second belt is anchored at a fixed point, proximate each of the ends.

7. An actuation system, as set forth in claim 6, wherein two of the second plurality of pulleys are disposed in spaced relationship to each of the bridge crane, the trolley, and the end effector;
   wherein four of the second plurality of pulleys are disposed on the bridge crane; and
   wherein two of the second plurality of pulleys are disposed on the trolley.

8. An actuation system, as set forth in claim 1, wherein the third belt is anchored at a pair of fixed points disposed in spaced relationship to the end effector.

9. An actuation system, as set forth in claim 8, wherein the third belt extends between opposing ends and the third belt is anchored at a fixed point, proximate each of the ends.

10. An actuation system, as set forth in claim 9, wherein two of the third plurality of pulleys are disposed in spaced relationship to each of the bridge crane, the trolley, and the end effector;
    wherein four of the third plurality of pulleys are disposed on the bridge crane; and
    wherein six of the third plurality of pulleys are disposed on the trolley.

11. An actuation system, as set forth in claim 1, wherein each of the actuators are fixed such that each of the actuators do not move with any of the bridge crane, the trolley, and the end effector along the X axis, Y axis, and Z axis, respectively.

* * * * *